Figure 1:
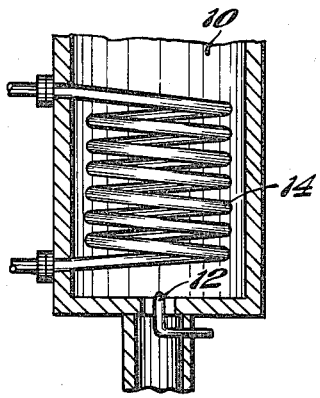

Sept. 28, 1954     L. C. PESKIN     2,690,051
HEAT TRANSFER SYSTEM UTILIZING SUSPENDED
PARTICLES IN A GAS AS VAPOR
Filed March 3, 1950

Patented Sept. 28, 1954

2,690,051

UNITED STATES PATENT OFFICE 2,690,051

HEAT TRANSFER SYSTEM UTILIZING SUSPENDED PARTICLES IN A GAS OR VAPOR

Leonard C. Peskin, Glenside, Pa., assignor to Thermal Research & Engineering Corporation, Conshohocken, Pa., a corporation of Delaware Application March 3, 1950, Serial No. 147,353

6 Claims. (Cl. 60—40)

The present invention relates to heat exchange media and methods and apparatus for transferring heat to or from a gas.

The problem of conduction of heat into or out of a gas is largely that of the formation of the "film" of gas which is closely adherent to the metal surface, and which constitutes the greatest resistance to heat flow. The existence of the film has been recognized for many years, and various attempts have been made to overcome the resistance to conduction of heat therethrough, but these have mainly consisted of expedients for increasing the velocity and turbulence of the gas in the neighborhood of the heated surfaces. Some gains have been made in that way, but the film still remains the greatest impediment to heat transfer.

The principal object of the present invention is to provide improved methods of heat transfer in respect to a gas, whereby the heat may be transmitted by radiation as well as convection and whereby the film resistance to heat flow may be appreciably reduced.

A further object of the invention is to provide improved applications of my method of heat exchange, particularly in the construction of closed-cycle systems, as in the closed-cycle gas turbine.

With this object in view, as well as other objects as will hereinafter appear, the present invention makes use of the fact that while conduction of heat is impeded by the film, radiation of heat is substantially unimpeded. While radiation to a transparent gas is not ordinarily effective, except over narrow infra-red absorption bands for certain gases, the present invention makes effective use of the radiation spectrum regardless of the gas by means of a suspension of fine heat-absorbing particles which may take the form of "black" bodies (whether or not they are actually black in color), and which are non-reactive with the gas in which they are suspended. For example, in a closed-cycle system using inert gases such as argon or krypton, finely divided carbon black particles are suitable. For air at high temperatures, various refractory particles, such as oxides or silicates, may be employed.

The size distribution of the suspended particles is important. For several reasons it is advantageous to use particles of extreme fineness: first, that the particles will not tend to settle out, but will remain in suspension under such velocity conditions as exist in the system; second, to provide a large surface for what may be termed the "internal" heat transfer, namely, the transfer between the particles and the gas itself; and third, to reduce the abrasive effects of the particles. For a given quantity of suspended material, the internal heat transfer will be more effective, the finer the particles. On the other hand, at normal furnace wall temperatures, which may be in the neighborhood of 1000° K., the peak of the radiation spectrum may be in wavelengths of 2 to 3 microns, which are not small in comparison with the smaller particles. Hence while it is preferred that most of the particles will be in the form of a fine dust or smoke, the presence of some larger particles may not be detrimental and may serve to increase the heat absorption in the long wave portions of the spectrum.

The suspended particles are preferably present in sufficient quantity to effect a large part of the heat transfer by radiation. Some convection of heat will also take place, because of cross-components of velocity due to turbulence, and the transfer of heat by convection is improved by the presence of the particles in a manner to be described more fully later. The relative predominance of radiation and convection effects will largely depend on temperature, since the radiation of heat increases rapidly with increasing temperatures.

While heat transfer to small suspended particles has been the subject of extensive study (see a paper entitled "Heat transfer to clouds of falling particles," by Johnstone, Pigford and Chapin, in Trans. A. I. C. E., February 25, 1941, and references cited therein) the investigations have generally been concerned with the absorption of heat by the particles themselves (as for chemical treatment thereof), and so far as I am aware the actual introduction into or abstraction of heat from a gas by the suspension of particles in the gas has not been proposed, and the particle sizes with which most such studies have been made have been too large for effective internal heat transfer as well as for practical use in moving machinery.

The quantity of suspended material is also important. An optimum quantity exists for the maximum effective rate of heat transfer to the gas, since if the quantity is too small, sufficient heat will not be radiated to the particles themselves, while if the quantity is too large, it may detract from the thermodynamic properties of the gas. Although the optimum quantity has not been determined for all cases, since it varies for different gases and suspended media and on the use to which the gas is to be put, it has been found that in general the optimum quantity is usually such that the heat capacity of the particles is between 5% and 20% of the heat capacity of the gas. In some systems, as in the closed-cycle gas turbine, the particles introduce advantageous thermodynamic effects by intercooling the fluid during compression and making additional heat available during expansion.

Figure 2:
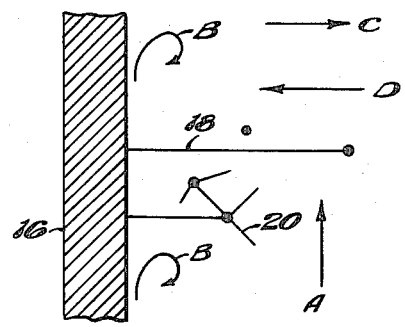
Figure 3:
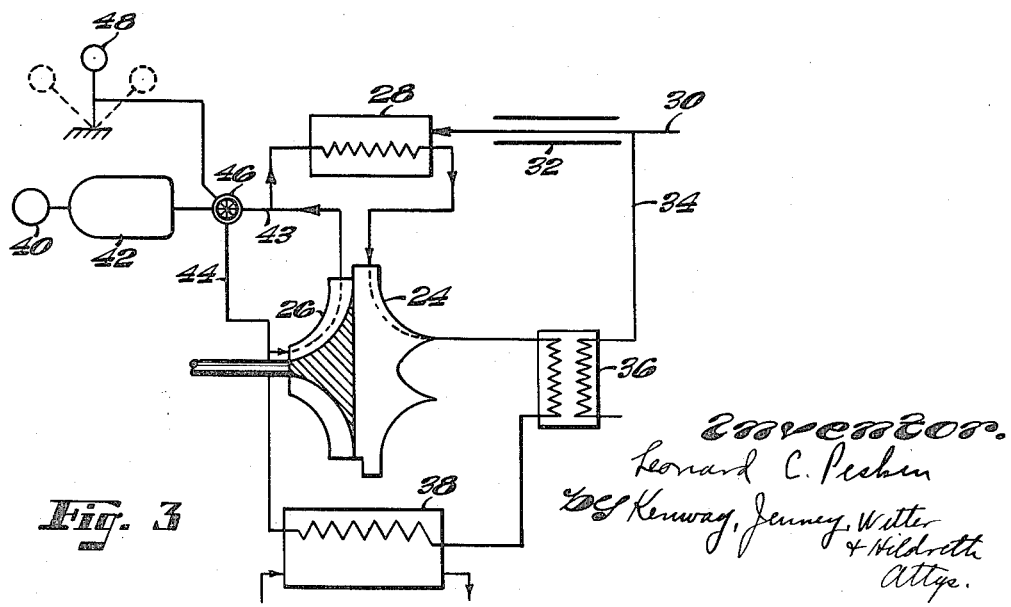

In the accompanying drawing, Fig. 1 is a diagram of a heat exchanger which utilizes the principles of the invention; Fig. 2 is an enlarged sectional view to illustrate the principles of the invention; and Fig. 3 is a diagram of a closed-cycle system embodying the features of the present invention.

In Fig. 1 there is shown diagrammatically a heater for gas or vapor, comprising a furnace chamber 10 into which extends an oil-fired combustion nozzle 12. In the chamber is a coiled tube 14 through which the gas passes.

The heat exchange medium comprises a gas or vapor in which a smoke or dust of heat-absorbing particles is suspended. The transfer of heat into the gas occurs both by radiation and by convection. These effects will be considered separately.

First, in respect to radiation, the suspended particles absorb radiant energy at a rate proportional to the difference of the fourth powers of the temperatures of the hot wall and the particles.

The mechanism of heat transfer by radiation is illustrated in Fig. 2 which is a cross section through the tube on an enlarged scale, for example, the wall of the tube 14 is illustrated at 16, but may be understood to represent generally any heat exchange wall heated to a high temperature by combustion or any suitable means. The heat exchange medium is on the right hand side of the wall and comprises the gas in which the particles are suspended. Straight unbroken lines represented at 18 indicate paths of direct radiation from the hot tube wall to one of the suspended particles. This direct radiation to a suspended particle along a straight line is a condition which always tends to take place but is influenced to the extent that the wavelengths of the radiation are long or short with respect to the encountered particle sizes. In general, the "cross-section" of the particles for absorption is substantially the same as the geometrical cross-section if the particle size is several times the wavelength. Some scattering also occurs, particularly from the smaller particles, as indicated roughly by the paths 20. Such scattering effects are not detrimental and in fact are desirable to insure sufficiently long paths so that a substantially complete absorption will take place before the radiant beam completely traverses the chamber. In general the particles will be in the form of a fine dust, such as fine carbon black particles of the order of one to five microns, or smaller, in diameter with a small percentage of particles of somewhat larger size for absorption of the longer rays. In a closed cycle system a rare gas, or at least an inert gas, may be used and therefore the suspended particles may be of carbon black. If air is the cycled medium, suspended particles of refractory material may be used.

The next effect is a transfer of heat from the particles to the gas, which transfer has been referred to above as the internal heat transfer. It is important that this transfer take place at a very high rate in order that the energy absorbed by the particles may be put into the gas, and further that the temperatures of the particles themselves will correspond closely to the gas temperature, whereby the particles will be available for further absorption of radiant energy from the hot wall. For example if the temperature of the wall is 1000° K., the internal heat transfer should be so rapid that the particles themselves are close to 600° in that region, since if the particles were allowed to maintain a materially higher temperature, under those circumstances, the rate of absorption of radiant energy would be reduced. It is, accordingly, essential to maintain a high rate of transfer from the particles into the gas. While the exact mechanism of such transfer is not completely understood, it is believed that it occurs mainly by conduction or, viewing the matter on the microscale, it occurs by reason of collision between gas molecules and the suspended particles. The presence of the gas film, adherent upon each particle, therefore would tend to resist the internal heat transfer. However, the film adherent to a small particle is exceptionally thin and furthermore its area integrated over the enormous number of particles is extremely large. Since the rate of conduction through the film is proportional to area, and the surface area of the particles may be made exceptionally large by reason of the use of particles of sufficient fineness, the internal heat transfer may be considered substantially instantaneous.

As noted above, the transfer from the hot wall to the particles occurs by radiation and convection. Referring now to convective phenomena, these arise because of turbulence. As shown in Fig. 2, the arrow A represents the general direction of flow, while curved arrows B roughly represent eddies or turbulent currents. As a consequence the gas stream is subject to cross-flows; in other words, there are crosswise components of velocity, as represented by arrows C and D, between the wall and the center of the tube. While convection is the principal mechanism of heat transfer to an ordinary gas or vapor, the convective effects are multiplied by the presence of the suspended particles, since the particles tend to scrub the film away from the surface and thereby project the gas molecules into the gas stream with an increased cross velocity. This scrubbing effect is exhibited by even the finest particles, which appear capable of tearing the adherent gas molecules out of the film, while, if most of the particles are sufficiently fine, they have no appreciable abrasive or erosive effect on the metal wall.

The gas molecules, as well as the suspended particles, that are projected across the gas stream rapidly convey heat into all parts of the stream. Heat is transferred from the particles to the gas itself by the mechanism of "internal" heat transfer in the same manner as previously described.

Both the radiative and convective phenomena occur together, but in varying degrees, depending on temperatures, gas velocities, turbulence, etc. At lower temperatures the convective effects predominate, while at higher temperatures the radiation from the wall to the particles may constitute the major heat transfer. With low gas velocities, where laminar flow may exist, convective transfer is low, but radiation may be effective for substantially the entire transfer if the wall temperature is sufficiently high; on the other hand at low temperatures high velocities and turbulence may be required in order that convective transfer will predominate.

While the foregoing description has been directed to flow of heat from a wall to a gas, the same principles apply to the flow of heat from a gas to a wall at lower temperature; hence the use of the suspended-particle heat transfer medium of the present invention is equally advantageous for either direction of heat flow.

The present invention may be utilized in many heat transfer applications, one of which will now be described, namely, a closed-cycle gas turbine system. The system comprises a compressor and a turbine between which is connected a high temperature heat exchanger heated by combustion. There is also provided a low temperature heat exchanger connected between the outlet of the turbine and the inlet of the compressor. While closed-cycle gas turbines have given satisfactory performance in some installations, their usefulness has been limited by the excessive size of the heat exchangers. The choice of the gas has heretofore required a difficult compromise. For most effective heat exchange it has been desirable to use a gas of high specific heat such as helium. However, such a gas requires compression and expansion in several stages. The present invention enables the use of a gas of low specific heat, preferably an inert monatomic gas such as krypton or argon, or a mixture thereof, which gases require fewer stages of compression, and frequently only a single stage, for satisfactory closed-cycle turbine operation. However, these gases are inherently poor from the heat exchange standpoint. I therefore contemplate the use of krypton, argon, and similar gases in which suspended particles of radiant heat-absorbing material are used, preferably a material such as carbon black or graphite, which will not have an erosive effect on the turbine or compressor blades. One form of turbine system is shown diagrammatically in Fig. 3.

In Fig. 3, the turbine wheel 24 and compressor 26 are mounted on the same shaft. A high-temperature heat exchanger 28 is connected between the compressor and turbine, and is heated by fuel introduced from a supply 30 into a combustion chamber 32, into which air for combustion is introduced at 34. Between the turbine and the compressor are an air preheater 36 and a water-cooled low temperature heat exchanger 38.

The principal closed gas circuit comprises the compressor 26, the high-temperature exchanger 28, the turbine 24, and the low-temperature exchanger 38. (The air heater 36 may be considered thermodynamically as a part of the low temperature exchanger 38.)

Before describing the other parts of the system, the operation of the closed cycle will be described.

The circulating medium is preferably a monatomic gas of high density, such as krypton or argon, containing a quantity of suspended small heat-absorbing particles. The gas may conveniently consist of the residue of air after substantially all of the oxygen and nitrogen have been removed. The suspended particles are preferably of the character previously described.

The advantages of the monatomic gas in a turbine cycle arise largely from the high value of $\gamma$, i. e., the ratio of specific heat at constant pressure to that at constant volume. As an example, with a given compressor operating under conditions that would result in compressing air to an adiabatic temperature ratio of 1.157, krypton is compressed to a temperature ratio of 1.628. A sufficiently high temperature ratio can usually be obtained for the krypton-argon mixture with a single stage of compression, whereas several stages would be required for air. Furthermore, it may be shown that under comparable conditions for different gases in the cycle, the velocity of sound varies as $\sqrt{\gamma-1}$, and hence the Mach number is reduced materially for monatomic gases, resulting in an increase in the compressor efficiency.

Since the high-density gases have poor heat-transmission characteristics, their use in closed-cycle turbines has been limited, in spite of their desirable thermodynamic properties, by reason of the excessive size of the required heat exchangers. However by the use of the circulating medium of the present invention, the heat exchange characteristics are so markedly improved that the heat exchangers 28, 36 and 38 may be of satisfactory size. The heat exchange occurs in the several exchangers according to the principles previously described.

The presence of the suspended particles also causes some changes in the thermodynamic properties of the gas, primarily in intercooling and reheating effects during compression and expansion. Thus, during compression, there is an intercooling effect due to the continuous absorption of heat from the gas as the gas is being compressed. During expansion in the turbine, this heat (as well as that introduced in the exchanger 28) is made available to the gas. The effects are complicated, and will not be described here in full detail; however, it may be noted that the suspended particles are in the nature of a heat reservoir, or regenerator, which is carried with the gas but which does not itself obey the gas laws. One immediate consequence is that the circulating medium makes available at the turbine an increased amount of energy per unit mass of gas, the increase being in proportion to the heat capacity of the particles relative to that of the gas. In some instances, this increased energy available may more than offset the increased heat added to the medium by reason of the presence of the particles, resulting in a more efficient cycle. The amount of included particles will depend usually on thermodynamic considerations, as well as on heat-exchange characteristics, but may be generally considered to be such that the heat capacity of the particles will be between 5% and 20% of that of the gas.

In addition to the parts above described, the system preferably has a tank 40 containing a supply of gas with suspended particles to make up losses, and a gas reservoir 42 connected across the compressor by lines 43 and 44 controlled by a valve 46 whereby some of the circulating medium may be drawn off and stored at a pressure between the inlet and outlet pressures of the compressor, thereby varying the effective density of the gas to accommodate changes in load. The valve 46 by which the amount of medium passed to or from the reservoir is controlled, is actuated by a suitable governor or other regulating device indicated diagrammatically at 48.

It will be understood by those skilled in the art that the present invention may be embodied in other closed-cycle thermo-dynamic systems, and also in open-cycle systems wherein a high heat-transfer rate is desired. As an example of an open-cycle system, air for combustion may be preheated in a heat exchanger of moderate size, by the inclusion of heat absorbing particles. The particles may be of non-reactive material, such as refractory oxides or silicates, or may be carbon particles if the maximum preheat temperature is below their ignition point or if combustion thereof in the higher temperature regions of the equipment is acceptable.

Having thus described the invention, I claim:

1. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being in sufficient quantity relative to the weight of gas to effect substantial heat transfer by radiation with respect to the heat exchange apparatus but less than a quantity which detracts materially from thermodynamic characteristics of the gas in the compression and expansion stages.

2. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being predominantly of a size which is of the order of magnitude of the wavelengths of heat radiation between the heat exchange apparatus and the medium, and in sufficient quantity relative to the weight of gas to effect substantial heat transfer by radiation with respect to the heat exchange apparatus but less than a quantity which detracts materially from thermodynamic characteristics of the gas in the compression and expansion stages.

3. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being in such an amount that their heat capacity is between 5% and 20% of the heat capacity of the gas.

4. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being predominantly of a size which is of the order of magnitude of the wavelengths of heat radiation between the heat exchange apparatus and the medium, and in such an amount that their heat capacity is between 5% and 20% of the heat capacity of the gas.

5. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being predominantly of a size between one and five microns, and in sufficient quantity relative to the weight of gas to effect substantial heat transfer by radiation with respect to the heat exchange apparatus but less than a quantity which detracts materially from thermodynamic characteristics of the gas in the compression and expansion stages.

6. A closed cycle thermodynamic system comprising a compression stage, an expansion stage, a high-temperature heat exchange apparatus between the two stages, the system having a circulating working fluid consisting of gaseous medium capable of being compressed and expanded in said compression and expansion stages, said medium including a mass of fine solid heat-absorbing particles, said particles being predominantly of a size between one and five microns, and in such an amount that their heat capacity is between 5% and 20% of the heat capacity of the gas.

References Cited in the file of this patent

UNITED STATES PATENTS

| Number | Name | Date |
| --- | --- | --- |
| 730,782 | Morrison | June 9, 1903 |
| 1,747,676 | Kerr | Feb. 18, 1930 |
| 2,155,383 | Carr | Apr. 25, 1939 |
| 2,288,734 | Noack | July 7, 1942 |
| 2,377,611 | Caldwell | June 5, 1945 |
| 2,443,210 | Upham | June 15, 1948 |

FOREIGN PATENTS

| Number | Country | Date |
| --- | --- | --- |
| 542,292 | Great Britain | Jan. 2, 1942 |
| 587,774 | Great Britain | May 6, 1947 |